SAMUEL IDE.
Improvement in Scroll Saw Guides.

No. 121,373. Patented Nov. 28, 1871.

Witnesses:
A. Bennewendorf.
Francis McArdle.

Inventor:
Sam'l Ide.
per Munn & Co.
Attorneys 121,373

UNITED STATES PATENT OFFICE.

SAMUEL IDE, OF MEDINA, NEW YORK.

IMPROVEMENT IN SCROLL-SAW GUIDES.

Specification forming part of Letters Patent No. 121,373, dated November 28, 1871.

*To all whom it may concern:*

Be it known that I, SAMUEL IDE, of Medina, in the county of Orleans and State of New York, have invented certain new and useful Improvements in Scroll-Saw Guide; and I do hereby declare that the following is a full, clear, and exact description thereof, which will enable others skilled in the art to make and use the same, reference being had to the accompanying drawing forming a part of this specification.

My invention consists in a pair of steel guides, which are clamped against the sides of the saw at one end and together at the other end behind the saw in such manner as to make a wedge-shaped groove corresponding to the saw, which is thinner at the back edge and gradually thickens toward the front; and above these steel guides is a pair of cotton-waste and oil-holding cups for lubricating the saw and the guides, one on each side of the saw, which are connected to plates somewhat like the plates of the guide, and they are clamped against a thin plate as thick as the thickest saw that will be used, which plate has a V-groove in one end which comes against the back edge of the saw and forms a guide therefor, no matter whether the saw be thick or thin. The said oiling-cups and thin plates thus serve to hold this guide, besides serving for the essential object for which they are designed.

Figure 1:
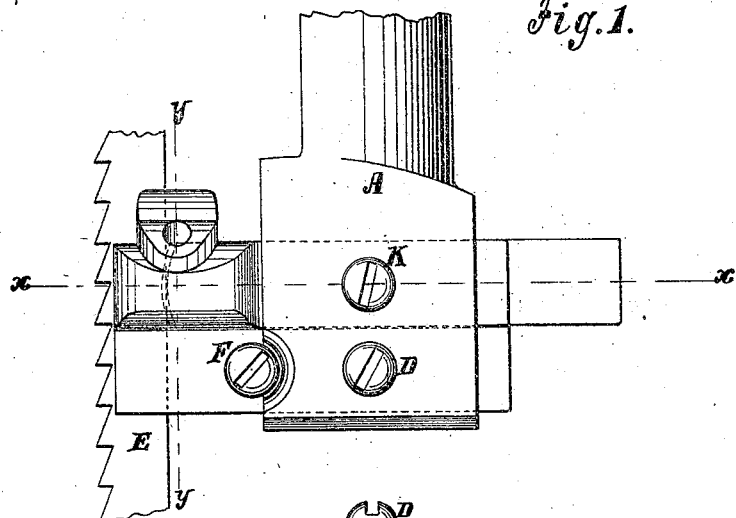
Figure 2:
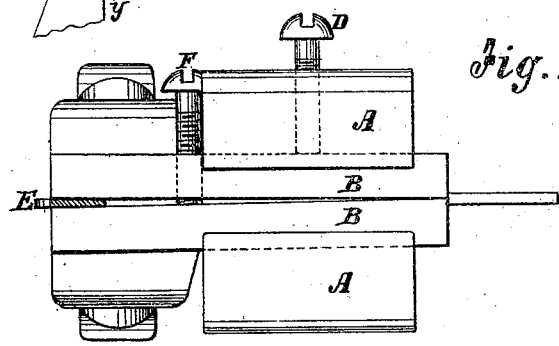
Figure 3:
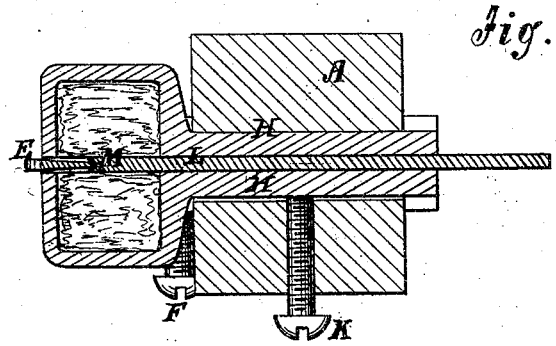
Figure 4:
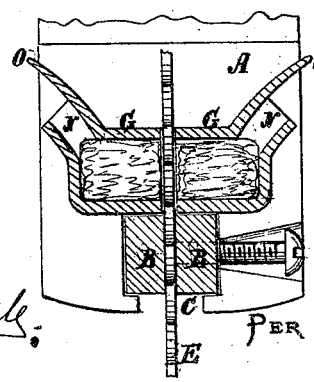

Figure 1 is a side elevation of my improved scroll-saw guide. Fig. 2 is a plan of the bottom. Fig. 3 is a horizontal section on the line $x\ x$ of Fig. 1, and Fig. 4 is a vertical section on the line $y\ y$.

A is the head or end of the shaft or arm employed for supporting the guides, which consist of the steel bars B, fitted side by side in the horizontal slot or notch $c$ in the lower end of said head A, where they are clamped by the set-screw D in said slot, and against the saw E at one end, and against each other at the other end, to make a wedge-shaped space between them adapted to the wedge-shaped form of the saw, which is thicker at the front than at the back. These guides, being properly arranged as to length, will thus fit the sides of the saw exactly; but to prevent clamping them against the saw too hard, a temper-screw, F, is fitted in one behind the saw to screw against the other, and thus materially lessen the pressure, or graduate it exactly to the degree required. Of course these guides project as far beyond the arm A as may be required to act upon the saw. Above these guides, which must of necessity be well lubricated, I have arranged a pair of lubricating-cups, G, one on each side of the saw, which are connected to plates H extending through the slot $c$ of arm A, to be secured by a clamp-screw, K, in the same manner that the guides B are; but instead of clamping them together and using a temper-screw, F, to prevent clamping the saw too tight, I avail myself of these plates for holding a guide, L, for the back of the saw, which consists of a thin plate of steel as thick as the thickest saw that will be used, so as to keep the cups G off the saw, and having a V-groove in the end M which comes in contact with the back of the saw, is adapted to hold thick or thin saws alike. The oil-cups are made of sufficient capacity to hold a quantity of cotton-waste or other absorbent packing, and are open at the sides fronting the saw, so that the packing comes against the saw. They are filled with oil through the holes N, over which are shields O for preventing the saw from filling them.

Having thus described my invention, I claim as new and desire to secure by Letters Patent—

1. The two independent guide-bars, B B, grooved guide-plate L arranged in a socket of the arm A and provided with the clamp and temper-screws K and F, as shown and described.

2. The combination of the oil-cups G, plates H, guide L, and clamp-screw K, with the saw and the arm A, substantially as specified.

SAMUEL IDE.

Witnesses:
ANDREW COOK,
CHARLES E. CLARK.

(130)